(12) United States Patent
Knoblich et al.

(10) Patent No.: US 12,099,176 B2
(45) Date of Patent: *Sep. 24, 2024

(54) APPARATUS AND METHOD FOR APPLYING A LIQUID IMMERSION MEDIUM INTO A CLEARANCE BETWEEN A MICROSCOPE OBJECTIVE AND A SPECIMEN TO BE EXAMINED UNDER THE MICROSCOPE

(71) Applicant: Carl Zeiss Microscopy GmbH, Jena (DE)

(72) Inventors: Johannes Knoblich, Jena (DE); Daniel Harangozo, Gauting (DE); Hendrik Herrmann, Bernried (DE); Robert Fessler, Krickenbach (DE)

(73) Assignee: Carl Zeiss Microscopy GmbH, Jena (DE)

( * ) Notice: Subject to any disclaimer, the term of this patent is extended or adjusted under 35 U.S.C. 154(b) by 623 days.

This patent is subject to a terminal disclaimer.

(21) Appl. No.: 17/288,422

(22) PCT Filed: Oct. 17, 2019

(86) PCT No.: PCT/EP2019/078255
§ 371 (c)(1),
(2) Date: Apr. 23, 2021

(87) PCT Pub. No.: WO2020/083746
PCT Pub. Date: Apr. 30, 2020

(65) Prior Publication Data
US 2021/0382288 A1    Dec. 9, 2021

(30) Foreign Application Priority Data
Oct. 24, 2018   (DE) .......................... 102018126527.1

(51) Int. Cl.
| | | |
|---|---|---|
| G02B 21/33 | (2006.01) | |
| G02B 21/24 | (2006.01) | |
| B05B 17/06 | (2006.01) | |

(52) U.S. Cl.
CPC ............ *G02B 21/33* (2013.01); *G02B 21/24* (2013.01); *B05B 17/0607* (2013.01)

(58) Field of Classification Search
None
See application file for complete search history.

(56) References Cited

U.S. PATENT DOCUMENTS

| | | |
|---|---|---|
| 1,891,348 A | 12/1932 | Ellinger et al. |
| 7,532,393 B2 | 12/2009 | Berns et al. |

(Continued)

FOREIGN PATENT DOCUMENTS

| | | |
|---|---|---|
| DE | 10123027 B4 | 7/2005 |
| DE | 10333326 B4 | 3/2007 |

(Continued)

OTHER PUBLICATIONS

International Search Report and Written Opinion for PCT/EP2019/078255 in German, mailed Jan. 16, 2020 (11 pgs).

(Continued)

*Primary Examiner* — Derek S. Chapel
(74) *Attorney, Agent, or Firm* — Bradley J. Thorson (57) ABSTRACT

The invention relates to a device for applying a liquid immersion agent into a gap (6) between a microscope objective (1) and a sample (2, 20) to be examined under the microscope, wherein the device has a blasting device (4) which is designed to introduce the immersion agent laterally into the gap (6) in a jet (5), and the blasting device (4) is designed to spray the immersion agent into the gap (6) in the form of a vapor or spray mist jet (5).

20 Claims, 6 Drawing Sheets

(56) References Cited

U.S. PATENT DOCUMENTS

| | | |
|---|---|---|
| 2004/0263961 A1 | 12/2004 | Hummel |
| 2005/0063046 A1 | 3/2005 | Arata et al. |
| 2005/0094258 A1 | 5/2005 | Tanabe et al. |
| 2005/0094293 A1 | 5/2005 | Tanabe et al. |
| 2006/0238885 A1 | 10/2006 | Hasegawa et al. |
| 2006/0274406 A1 | 12/2006 | Maass |
| 2007/0047093 A1 | 3/2007 | Hoering et al. |
| 2007/0127134 A1 | 6/2007 | Corbett |
| 2007/0291360 A1 | 12/2007 | Pirsch |
| 2007/0291361 A1 | 12/2007 | Lee |
| 2008/0252967 A1 | 10/2008 | Tomioka et al. |
| 2008/0259327 A1 | 10/2008 | Brueck et al. |
| 2009/0109416 A1 | 4/2009 | Dougherty et al. |
| 2010/0027109 A1 | 2/2010 | Liebel et al. |
| 2010/0110540 A1 | 5/2010 | Niv et al. |
| 2012/0104119 A1 | 5/2012 | Benalikhoudja |
| 2015/0015942 A1 | 1/2015 | Steinmeyer et al. |
| 2015/0015943 A1 | 1/2015 | Scheps et al. |
| 2015/0212310 A1 | 7/2015 | Fukuda et al. |
| 2015/0260975 A1 | 9/2015 | Schoen et al. |
| 2016/0334611 A1 | 11/2016 | Herrmann et al. |
| 2018/0052314 A1 | 2/2018 | Brinkman et al. |
| 2021/0389578 A1* | 12/2021 | Knoblich ............... G02B 21/00 |

FOREIGN PATENT DOCUMENTS

| | | |
|---|---|---|
| DE | 102005040828 A1 | 3/2007 |
| DE | 102006042499 A1 | 3/2008 |
| DE | 102009044413 A1 | 5/2010 |
| DE | 102013011543 A1 | 1/2015 |
| DE | 102013011544 A1 | 1/2015 |
| DE | 102014003684 A1 | 9/2015 |
| DE | 202015105900 U1 | 12/2015 |
| DE | 102015200927 A1 | 7/2016 |
| DE | 202017000475 U1 | 3/2017 |
| EP | 1717630 | 4/2006 |
| EP | 1870752 A1 | 6/2007 |
| EP | 1980892 B1 | 4/2008 |
| EP | 2905646 A1 | 1/2015 |
| GB | 353340 A | 7/1931 |
| WO | 2002093232 A2 | 11/2002 |
| WO | 2006005703 A1 | 1/2006 |
| WO | 2018138053 A1 | 8/2018 |

OTHER PUBLICATIONS

International Preliminary Report on Patentability for PCT/EP2019/078255, English translation, mailed May 6, 2021 (14 pgs).

* cited by examiner

APPARATUS AND METHOD FOR APPLYING A LIQUID IMMERSION MEDIUM INTO A CLEARANCE BETWEEN A MICROSCOPE OBJECTIVE AND A SPECIMEN TO BE EXAMINED UNDER THE MICROSCOPE

RELATED APPLICATIONS

The present application claims priority to PCT Application No. PCT/EP2019/078255, entitled DEVICE AND METHOD FOR APPLYING A LIQUID IMMERSION MEDIUM INTO A GAP BETWEEN A MICROSCOPE OBJECTIVE AND A SPECIMEN TO BE EXAMINED UNDER THE MICROSCOPE, filed Oct. 17, 2019, and claims the benefit of German Application No. 102018126527.1, filed Oct. 24, 2018, which are both hereby incorporated herein by reference in their entirety.

FIELD OF THE INVENTION

The invention relates to an apparatus for applying a liquid immersion medium into a clearance between a microscope objective and a specimen to be examined under the microscope, the apparatus having an injection device, which is configured to introduce the immersion medium laterally into the clearance in form of a jet.

The invention also relates to a method for applying a liquid immersion medium into a clearance between a microscope objective and a specimen to be examined under the microscope, the immersion medium being introduced laterally into the clearance laterally in form of a jet.

DESCRIPTION OF THE RELATED ART

In microscopy it is common to use liquid immersion media, for example water or oil based, to increase resolution. The application of such liquid immersion medium into a clearance between a microscope objective and a specimen to be examined is described in a large number of publications, for example in DE 102013011543 A1, DE 102013011544 A1, DE 102014003684 A1, DE 102005040828 A1, U.S. Pat. No. 7,532,393 B2, EP 2905646 A1, DE 102006042499 A1, EP 1980892 B1, US 20100027109 A1, DE 10123027 B4, DE 10333326 B4 and US 2009109416 A1. The vaporization of liquid to generate a two-phase jet is known from US 20120104119 A1.

DE 202017000475 U1 and the generic DE 102015200927 A1 envisage injecting the immersion medium by means of a liquid jet from a spraying device laterally into the clearance between the microscope objective and for examining the specimen under the microscope.

The solution described in DE 102015200927 A1 comprises an apparatus and a method for forming an immersion medium film between a specimen carrier and the objective of a microscope, comprising an autoimmersion module for supplying the immersion medium from an immersion-medium reservoir to a point of impact on the specimen carrier or on the microscope stage, consisting of a injection device, which is provided with a nozzle and is connected to a pump for generating a jet of immersion medium. As a result, a jet of immersion medium is sprayed at a defined speed onto a point of impact on the specimen carrier or a point on the microscope stage. Compared to the disadvantages of the solutions of the prior art mentioned at the beginning, in which technical equipment for performing the autoimmersion must be arranged at the objective or in the space close to the objective, DE 102015200927 A1 shows a solution that does not require a mechanical modification of the objective used and thus allows improved handling and continuous work with different objectives. In order to achieve this, the injection device must be arranged so far away from the objective that a change of the objective by the microscope objective turret and the movement of the microscope stage can take place unhindered. Possible and advantageous locations that are mentioned for the arrangement of the injection device are the axis of the objective turret or an arrangement outside the objective turret installation space directly on the microscope stand, in the case of which unhindered injection of the immersion medium is possible.

The consequence of this arrangement of the injection device on the microscope stand, which is very advantageous functionally and technically in terms of the installation space, is that the immersion medium jet has to be injected over a distance of approximately 20-30 mm, depending on the type of microscope construction. Due to this relatively large distance, parameters of the immersion medium jet (e.g. flow velocity, jet diameter, jet characteristics) must be selected such that the immersion liquid volume required by the particular objective "arrives" completely and safely at the desired point of impact on the immersion medium meniscus between the objective and the specimen carrier. One problem is the flow energy of the immersion medium jet tends to generate air bubbles both in the jet itself and at the point of impact or in the nascent (first immersion) or already existing (replenishing-immersion). For microscopic applications, in particular for microscopic contrast methods (e.g. differential phase contrast, dark field contrast), air bubbles in the object field are absolutely unacceptable for reasons of image quality alone. In addition, air bubbles can give rise to microscopic malfunctions, e.g. in the autofocus system. Due to the air bubble problem, DE 102015200927 A1 provides for complex measures for avoiding and reducing bubbles.

Proceeding from this, the invention is based on the object of avoiding the formation of air bubbles when the immersion medium is introduced.

SUMMARY OF THE INVENTION

The invention is characterized in the independent claims. The dependent claims relate to preferred developments.

The immersion medium is sprayed laterally into the clearance in form of a jet, but no longer as a liquid jet but as a vapor jet or spray jet. The immersion medium is thus sprayed in form of a two-phase jet of immersion medium and air, specifically as a vapor jet or spray jet. In this way, the arrangement on the microscope stand that is very advantageous functionally and technically in terms of installation space can be retained, without the associated geometrical distance of 20-30 mm from the clearance between the microscope objective and the specimen to be examined under the microscope leading to the formation of air bubbles and thus impairing the microscopic imaging.

There are various options for generating the two-phase jet. For example, known pressure-atomizing spray nozzles, which eject the immersion medium as a spray and thus spray it into the jet, may be used. Alternatively, a vapor or spray may be generated, and the vapor or spray thus generated is sprayed into the jet with a gas injection device. The vapor or spray may be generated thermally or mechanically, that is to say by means of a vibration nebulizer. In particular, piezo and/or ultrasonic vibrators may come into consideration for this.

The jet should usually be configured differently to establish an immersion for the first time (so-called first immersion) than to maintain an already existing immersion (so-called replenishing-immersion). To establish the immersion, the jet must be configured in such a way that the meniscus, which fills the clearance between the microscope objective and for examining the specimen under the microscope, is formed by condensation. If this meniscus already exists, i.e. if an immersion has already been established, the jet must be configured in such a way that the meniscus is preserved by the spray or vapor being absorbed on the already existing meniscus and accumulating there. Usually the jet is then weaker and/or pulsed.

For the apparatus, by analogy it is preferred to provide two operating modes. A first operating mode, in which the vapor or spray jet is configured to establishing a clearance-filling meniscus of immersion medium for the first time, and a second operating mode, in which the jet is configured to maintain an already existing meniscus. For the first immersion, the apparatus is first switched to the first operating mode. Once the desired immersion state has been reached, for which a suitable detector may optionally be provided, the apparatus is switched to the second operating mode. Said detector may be implemented by evaluating an image obtained with the microscope objective. Incomplete immersion can easily be detected from a microscope image. It is therefore expedient in one embodiment that the apparatus for applying the immersion medium is connected to or implemented comprising a control device of the microscope to which the microscope objective belongs, and that the control device carries out an image evaluation of the image obtained with the microscope objective in order to detect whether the first immersion is complete and the device can be switched to the second operating mode for replenishing-immersion.

In embodiments, it is provided that the vapor or spray jet has a different length (in practical implementation, for example of a length of 3 ... 30 mm, at even greater distances the risk of undesired wetting of further microscope components in the object area increases due to the divergence of the jet) depending on the installation space conditions and nozzle geometry. In particular, the length may be adjustable depending on the objective.

It is understood that the features mentioned above and the features still to be explained below can be used not only in the combinations specified but also in other combinations or on their own without departing from the scope of the present invention.

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

DETAILED DESCRIPTION OF THE INVENTION

Figure 1:
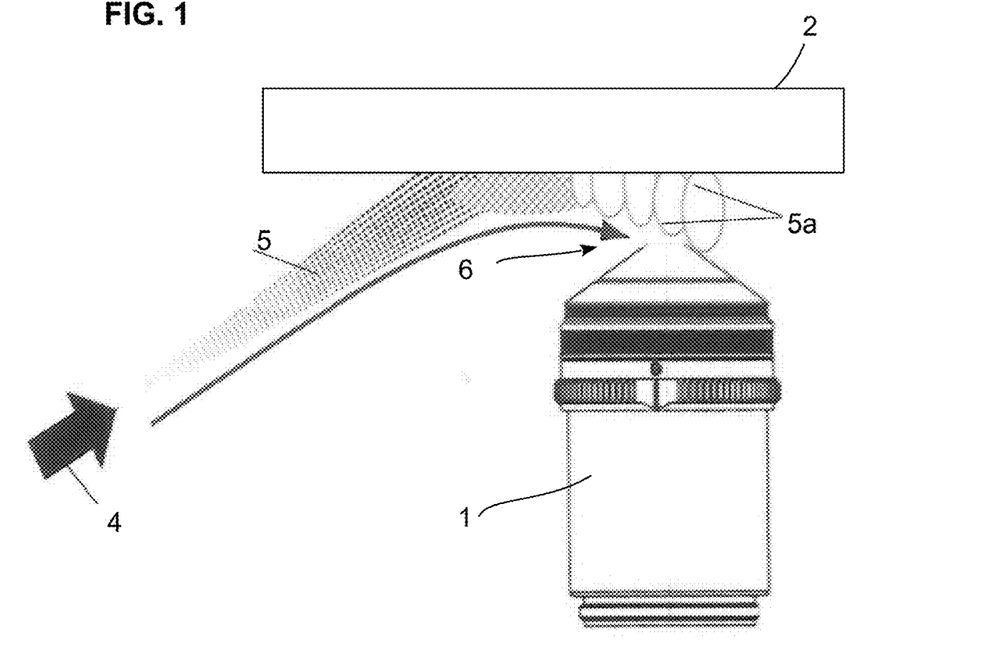
FIG. 1 shows a schematic representation of the first immersion by means of a directed spray jet or vapor jet.

FIG. 1 shows first immersion at an objective 1 of an inverted microscope. In this case, immersion of the microscope 1 together with the specimen carrier 2 is to be established. A directed spray jet or vapor jet 5 emerges from a correspondingly designed spray or vapor nozzle 4, and is optionally supported in terms of extension by a directed air flow likewise emerging from the nozzle 4. The jet 5 delivers a two-phase mixture of immersion medium and air. This jet is directed onto a clearance 6 between the objective 1 and the specimen carrier 2. It moves over a distance of approximately 20-30 mm. Once it has arrived at the specimen carrier 2, the immersion medium condenses out from the two-phase mixture, that is to say from the spray or vapor, and deposits on the specimen carrier in the form of droplets. Capillary forces draw the droplets 5a into the clearance 6 between the objective 1 and the specimen carrier 2. This results in a defined immersion medium, the side of which depends on the specific working distance of the objective 1 and the object field diameter, volume wetting the effective object field. The point of impact and the intensity of the directed spray or vapor jet 5 are chosen such that reliable and reproducible immersion takes place, with a meniscus forming in the clearance 6 between the objective 1 and the specimen carrier 2.

Figure 2:
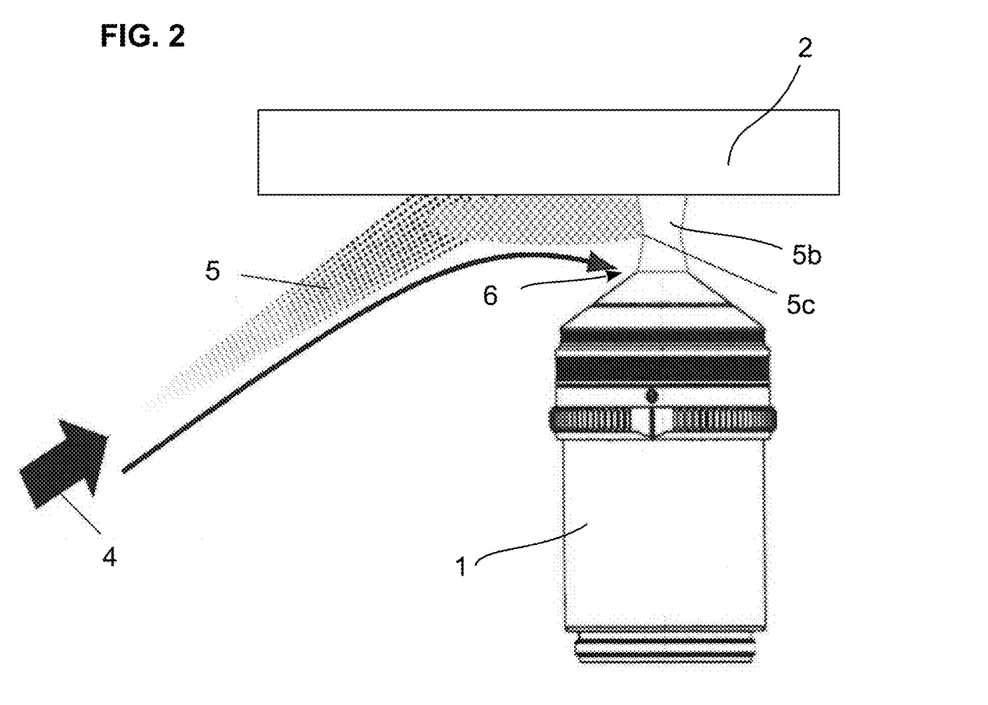
FIG. 2 shows a schematic representation of replenishing-immersion.

FIG. 2 shows the situation in the case of replenishing-immersion, that is to say when the clearance 6 has already been filled by a meniscus 5b of immersion medium. Again, the directed jet 5 emerges from the spray or vapor nozzle 4. Once it has arrived at the meniscus 5b and in particular at the specimen carrier 2, it is absorbed by the already existing meniscus 5d on its impact side 5c, whereby a volume of immersion medium that has been lost previously, for example due to evaporation, and is missing is replenished, in order to maintain complete immersion even over long periods of time. The absorption of spray or vapor through the meniscus 5d, involving a lower amount of energy compared to a purely liquid jet, does not cause any intake of air bubbles, since the very low energy input does not cause the meniscus to vibrate, which could induce the formation of air bubbles.

Depending on the application, feeding of the immersion medium can either be used to generate a first immersion or for replenishing-immersion, this being generated according to FIG. 1 or in some other way, in particular conventionally manually.

Figure 3:
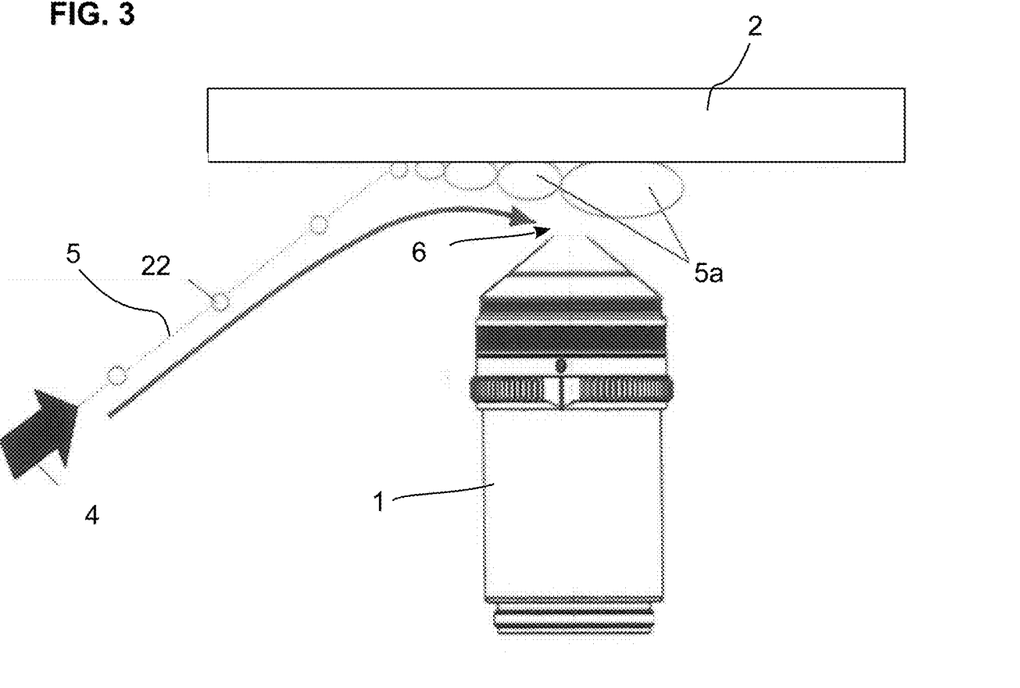
FIGS. 3 and 4 show immersion methods using a prior art jet.
Figure 4:
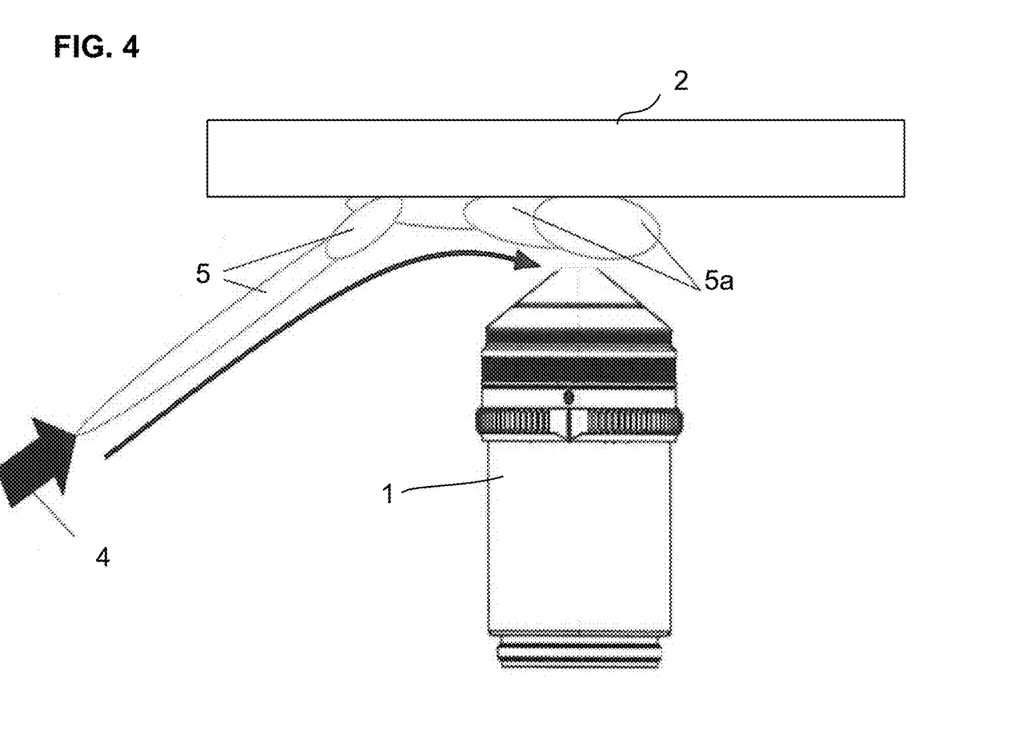

For a better understanding of the flow dynamic relationships when applying the immersion medium by a spray or vapor jet, various liquid-injection methods such as those used in the prior art, for example the already mentioned DE 102015200927 A1, are described referring to FIGS. 3 and 4. This description refers by way of example to the case of water immersion. The explanation apply analogously to oil-based immersion media.

In FIG. 3, a jet 5, which consists of a sequence of water droplets 22, is applied from the now conventionally designed nozzle 4. In FIG. 4 there is a continuous water jet 5. Both are a single-phase jet in each case, either continuous or discontinuous.

Since the change in the potential energy along the water jet caused by the effect of gravity is small in comparison with its kinetic energy, description as a trajectory parabola is realistic. Two instabilities lead to disintegration of the water jet into individual droplets: on the one hand Rayleigh instability, caused by surface tension, and on the other hand the viscous friction in the surrounding air, i.e. a "wind-induced" instability. The Rayleigh decay, in which a homogeneous jet first forms after the nozzle, and then decays, is the most important form of flow here, which reacts very sensitively in terms of flow dynamics to smallest disturbing influences. Therefore, the flow parameters of the water jet must be adjusted very precisely in order to achieve reproducible results.

Influx of air bubbles can be explained by viscous friction, among other things. The energy supplied to the meniscus (immersion column) during immersion consists of kinetic energy $E_{kin}$ and surface energy $E_\sigma$. For a homogeneous jet, their ratio is given by $$\frac{\partial/\partial_t E_{kin}}{\partial/\partial_t E_\sigma} = \frac{1}{8} We$$

wherein both are of the same order of magnitude for lower speeds, where We is the Weber number. The energy supplied must ultimately be dissipated by viscous friction. The friction power in relation to the inflow of kinetic energy is characterized by the Reynolds number Re. The Reynolds number of a jet of diameter d characterizes how effectively the jet can be decelerated when it hits the specimen carrier and flows into the meniscus (immersion column). Smaller values for jet diameter d and jet speed u are more favorable here in terms of flow dynamics. The Reynolds number $Re_d$ of meniscus diameter $d_M$ characterizes how well vibrations excited in the meniscus are damped. Here, too, smaller values of u and $d_M$ are more favorable in terms of flow dynamics with regard to the tendency for air bubbles to form.

In the case of the individual droplets 22 of a discontinuous, but nonetheless single-phase water jet 5 shown in FIG. 3, the defined and reproducible jet 5 is generated by external excitation, e.g. by a pump driven for example by means of a piezo actuator. This discontinuous single-droplet jet be considered as a jet having maximum excitation of natural oscillations of the water/immersion-medium meniscus, resulting in a greater influx of air and increased air bubble formation being induced. Such a jet can also be considered as a sequence of individual replenishing-immersions, each of which causing a significantly higher influx of air than the first immersion. This equally shows that, even if the distance between the individual droplets becomes very large, poorer results are achieved than with a single pulse of a continuous jet, see FIG. 4.

Due to the aforementioned physicals discussed with regard to FIG. 3, a constant jet that is as homogeneous as possible, which is generated by a continuously operating pump, for example a diaphragm pump or a diaphragm pump with an additional pressure accumulator with a valve, consequently provides better flow dynamic results with fewer air bubbles, see FIG. 4.

These fluidic disadvantages are now eliminated by the solution according to FIG. 1 and FIG. 2. As an alternative to the prior art the water jet used for immersion, an air jet is used, which transports the immersion medium in a finely atomized form (mist or spray) or only in gaseous form as a vapor, i.e. combines to a two-phase mixture. Once this has arrived at the destination, the spray or vapor carried along in the partially or fully vapor-saturated air jet condenses again. It can be assumed that a good part of the water droplets evaporates from this water based spray-droplet immersion during the "flight" in the air jet—on average enough that a saturated atmosphere is present in the jet—and likewise condenses only at the destination, i.e. on the surfaces of the specimen carrier and the objective.

In this connection, the partially or completely vapor-saturated air itself is not regarded as an immersion medium, but rather only as a carrier medium for the liquid immersion medium, hence the term two-phase mixture. This conforms to the usual definition that only those media that have a refractive index differing significantly from that of a vacuum are immersion media. Its purpose is either to adjust the refractive index to that of the medium in which the microscopic object is embedded, or to significantly influence the numerical aperture. This is not the case with air. The difference from a vacuum having a refractive index of 1.000 is <0.1% for air, while commonly used media have refractive indices of 1.33 (water), 1.47 (glycerine), 1.518 (immersion oil). The spray or vapor condensing on the specimen carrier thus has the same refractive indices as the fluid immersion media before their atomization or evaporation.

By definition, spray or technically generated mist is an atomized liquid floating in the air like a mist and thus a liquid in terms of its aggregate state. Depending on the type of generation, the spray mist has typical droplet sizes in the range between 50 μm and 5 μm. Vapor, on the other hand, refers to a gas that is generally still in contact with the liquid or solid phase from which it emerged through evaporation or sublimation or that is present as pure gaseous vapor. Depending on how it is technically generated and depending on the temperature and air pressure, typical droplet sizes in the range between 100 μm and 1 μm occur in vapor. Both ranges are many orders of magnitude below known individual droplets 22.

The fundamental flow-dynamic or flow-energy advantages and the resulting procedural and application advantages of the inventive solution compared to liquid-jet immersions are as follows:

The immersion of mist/spray is associated with such small Weber and Reynolds numbers that inertia no longer plays a role in comparison with surface tension and viscous friction. The water droplets are therefore simply "sucked up" by the immersion meniscus surface that is forming, without stimulating it to vibrate and thus to form air bubbles. Gaseous water, i.e. water vapor, simply condenses on the immersion meniscus surface and does not excite the meniscus to vibrate, which likewise prevents the formation of air bubbles. The fundamental flow-energy advantage of spray or vapor immersion consists in the introduction of water or immersion medium into the meniscus surface with an energy of almost zero, which causative avoids formation of air bubbles. This new immersion method therefore dispenses with all further and additional measures for eliminating air bubbles in the meniscus compared to liquid-jet immersion methods, which always lead to the formation of air bubbles due to the much higher energy input into the meniscus surface. For application-sensitive long-term experiments, measures to eliminate air bubbles, e.g. x-y stage adjustment or z adjustment of the focusing system, are undesirable, adversely affect the measurements by incorrect repositioning of the stage and the focusing system or may even lead to the interruption of long-term experiments that sometimes run over several days. The inventive immersion method can therefore save method steps, and therefore time, errors can be avoided and many complex long-term experiments can be made possible in the first place.

Spray and vapor immersion are suitable for first and replenishing-immersion. However, the first immersion then takes a little longer per objective than a comparable liquid-jet immersion, but is on average shorter than a manually performed immersion.

In particular in the case of replenishing-immersion, which is more important in application terms than first immersion, the inventive solution is a genuine alternative to liquid-jet immersion according to the prior art, since only the evaporated portion of the meniscus has to be replenished by a small addition. Especially in long-term experiments with incubation, in which sometimes replenishing-immersion becomes necessary over 100 times, the inventive solution shows its particular application advantage by its air bubble-free replenishing-immersion.

The fundamental formation mechanisms in a spray or vapor immersion shown by way of example are schematically represented in FIGS. 1, 2, 5-7. In principle, these arrangements also apply to other immersion media. To better show meniscus formation, the true-to-scale distance between the objective and the specimen carrier was deliberately chosen to be larger than the actual working distances for immersion objectives, which typically lie in the range between 0.1 and 3.7 mm.

Figure 5:
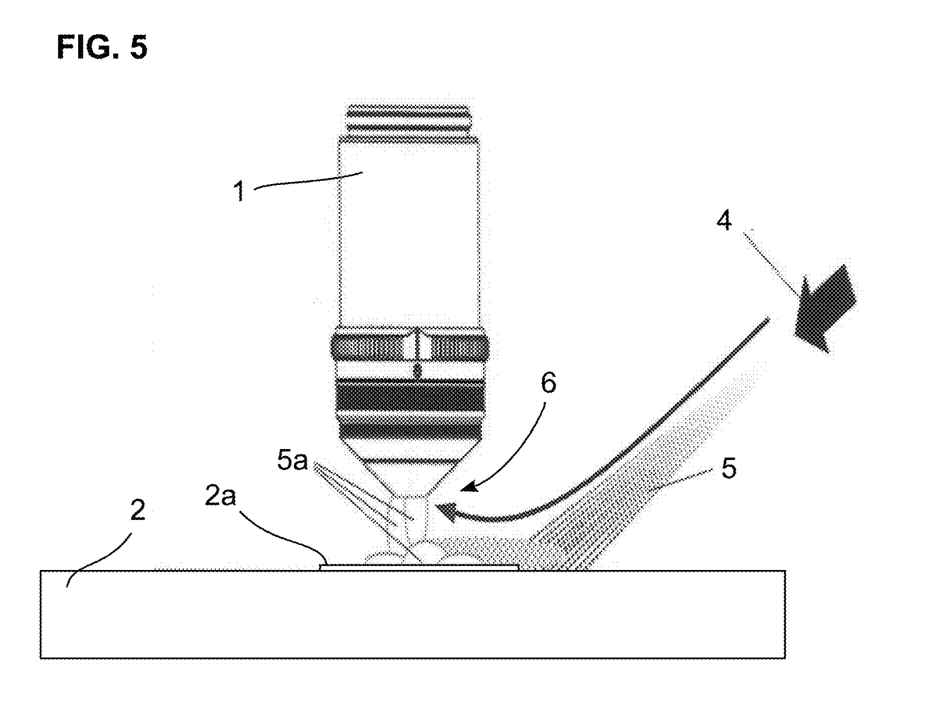
FIG. 5 shows a schematic representation similar to FIG. 1, but here for an upright microscope.

FIG. 5 shows the first immersion on an objective 1 of an upright microscope by means of a directed jet 5 of spray or vapor. In this case, the directed mist or vapor jet emerges from the mist or vapor nozzle 4, which is optionally supported by a directed air flow likewise emerging from the nozzle. Once it has arrived at the specimen carrier 2, the spray or vapor condenses and deposits droplets 5a, mainly on the front surface of the upper objective 1 but also on the cover glass 2a, which then ultimately form an air bubble-free water meniscus due to capillary forces between the objective 1 and the cover glass 2a and, depending on the volume of water needed for objective 1 (depending on its specific working distance and object field diameter), wets the entire visible object field on the slide.

By analogy with the inverted microscope, bubble-free replenishing-immersion is done also for the upright microscope on the basis of the same functional principle by absorption to an existing water meniscus.

There are various prior art methods for generating spray, mist or vapor.

Classic spray nozzles create an extremely fine liquid mist by atomization through the pressure of the spray medium. Various media, such as for example water, oils or emulsions, can be atomized. By choosing the nozzle bore and the spray pressure, almost all droplet sizes can be generated and, using special nozzle geometries, different spray cones can be produced.

In the case of thermal vapor or mist generation, liquid is for example vaporized from a liquid depot, for example from a soaked textile material, by an electrical heating element. The vapor/mist generated in this way is conveyed along a desired direction when a defined air flow is introduced, for example by generating a negative pressure. The functionality of an e-cigarette is also based on this basic principle known from the prior art.

The mechanical vapor or mist generation takes place by means of mechanical vibrations, typically in the range of ultrasonic frequencies up to the MHz frequency range, which are transferred to a liquid film. According to prior art, these vibrations are preferably generated by piezoceramic elements. These vibrations create capillary waves on the surface of the liquid, which form droplets at corresponding excitation frequencies. The droplet diameter decreases with increasing excitation frequency or higher density and lower surface tension of the respective liquid. Ultrasonic nebulizers can generate droplets of <5 µm.

Figure 6:
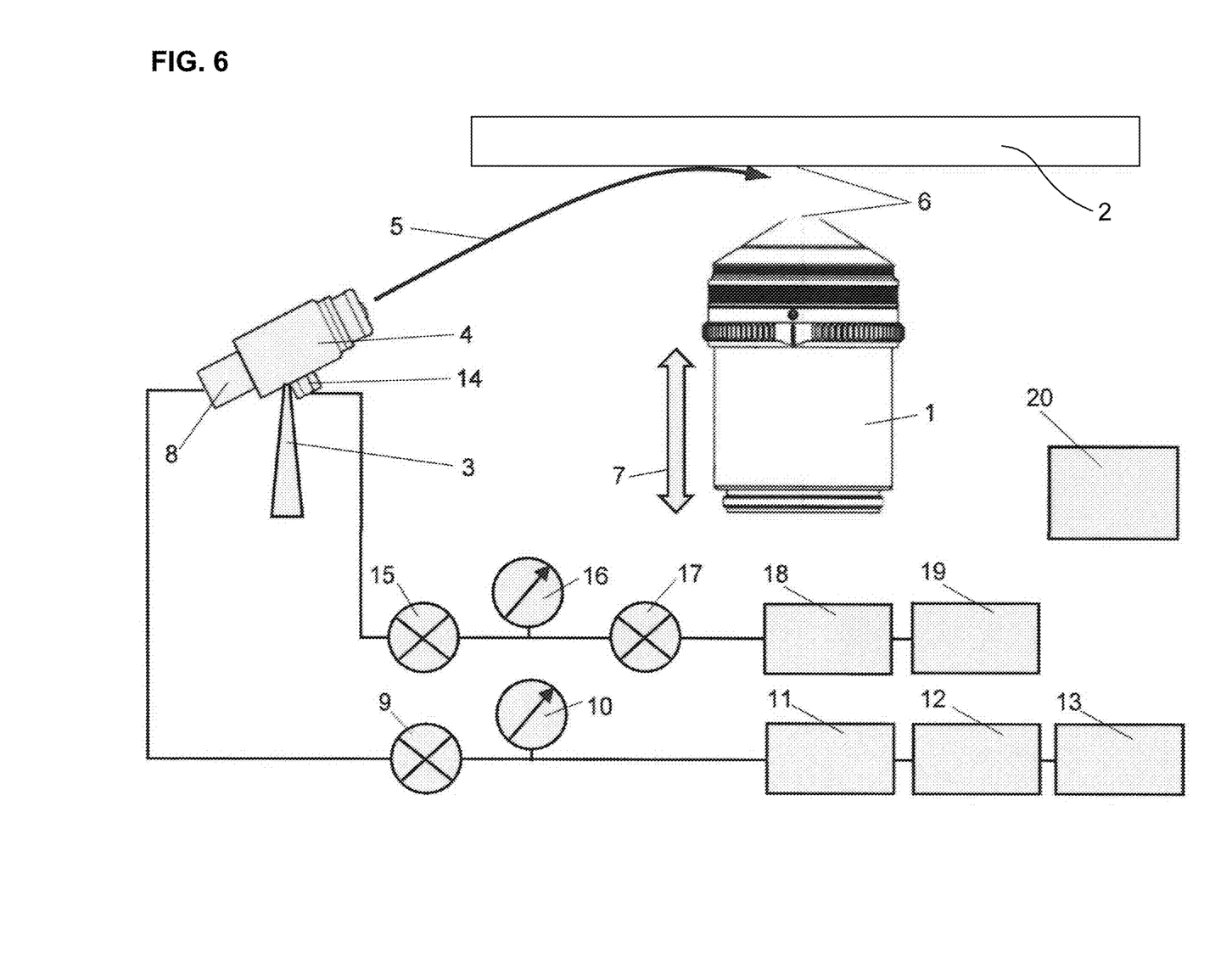
FIG. 6 shows a schematic representation of a device which is designed as an autoimmersion system.

In FIG. 6, a device shown by way of example, in the form of a spray autoimmersion system with a classical spray nozzle corresponding to the spray generation method mentioned under no. 1, is schematically shown for an inverted microscope.

In a typical inverted microscope arrangement, a focusable objective 1 is arranged below a specimen carrier or microscope stage 2, the immersion area for forming an immersion-medium meniscus being located in the clearance 6 between the objective 1 and the specimen carrier 2. A directed spray jet 5 is generated by a nozzle 4, which has a suitable small spray cone angle and is attached to a nozzle holder 3 at a suitable location on the microscope stand with structurally free access to the immersion area 6, and is sprayed towards the immersion area 6 to cause, by droplet condensation and capillary action formation of an immersion-medium meniscus 6 between the objective 1 and the specimen carrier 2. The nozzle 4 typically has two terminals, on the one hand a liquid terminal 8 to supply the immersion medium and on the other hand air terminal 14 via which the air used for transporting the spray to the immersion area 6 is provided. The immersion medium supply of a defined and constant liquid pressure, which can be controlled by a liquid check valve 9 and the magnitude of which is displayed by a liquid pressure indicator 10, is fed by a controllable liquid pressure accumulator 11, which is "supplied" with the immersion medium from a liquid pump 12 and an upstream liquid container 13. Air supply to the spray-mist nozzle, which can be controlled by an air check valve 15, takes place via an air pressure accumulator 18, the pressure of which is displayed by an air pressure indicator 16 and the adjustable pressure value of which is regulated and kept constant via an air pressure control valve 17. The air pressure accumulator 18 is fed by an air compressor or a compressed air feed 19. Due to the structural design of the spray nozzle 4, the two media, liquid and air are brought together and form a directed spray, the directed spray-mist jet 5 having droplet sizes in a typical range between 50 µm and 5 µm. At appropriate nozzle shape, e.g. when using flat jet nozzles of the so-called deflector or baffle plate design, small ejection cone angles of 15°, which are required for a defined and limited wetting of the specimen carrier 2, can be implemented. For bubble-free immersion, low air jet pressures must be used in order to ensure a low flow-energy influx of immersion medium into the meniscus to be established (first immersion) or existing (replenishing-immersion) meniscus by absorption. All individual autoimmersion functional assemblies are optionally linked; they and their physical parameters are controlled via a central autoimmersion control unit 20, e.g. are controlled by a computer and special control software. So-called airless nozzles dispense with the compressed air supply 14-19 of the arrangement shown in FIG. 6; here the spray is generated by a special structural design of the nozzle. The advantage here is lower technical complexity compared to nozzles with air terminal.

Figure 7:
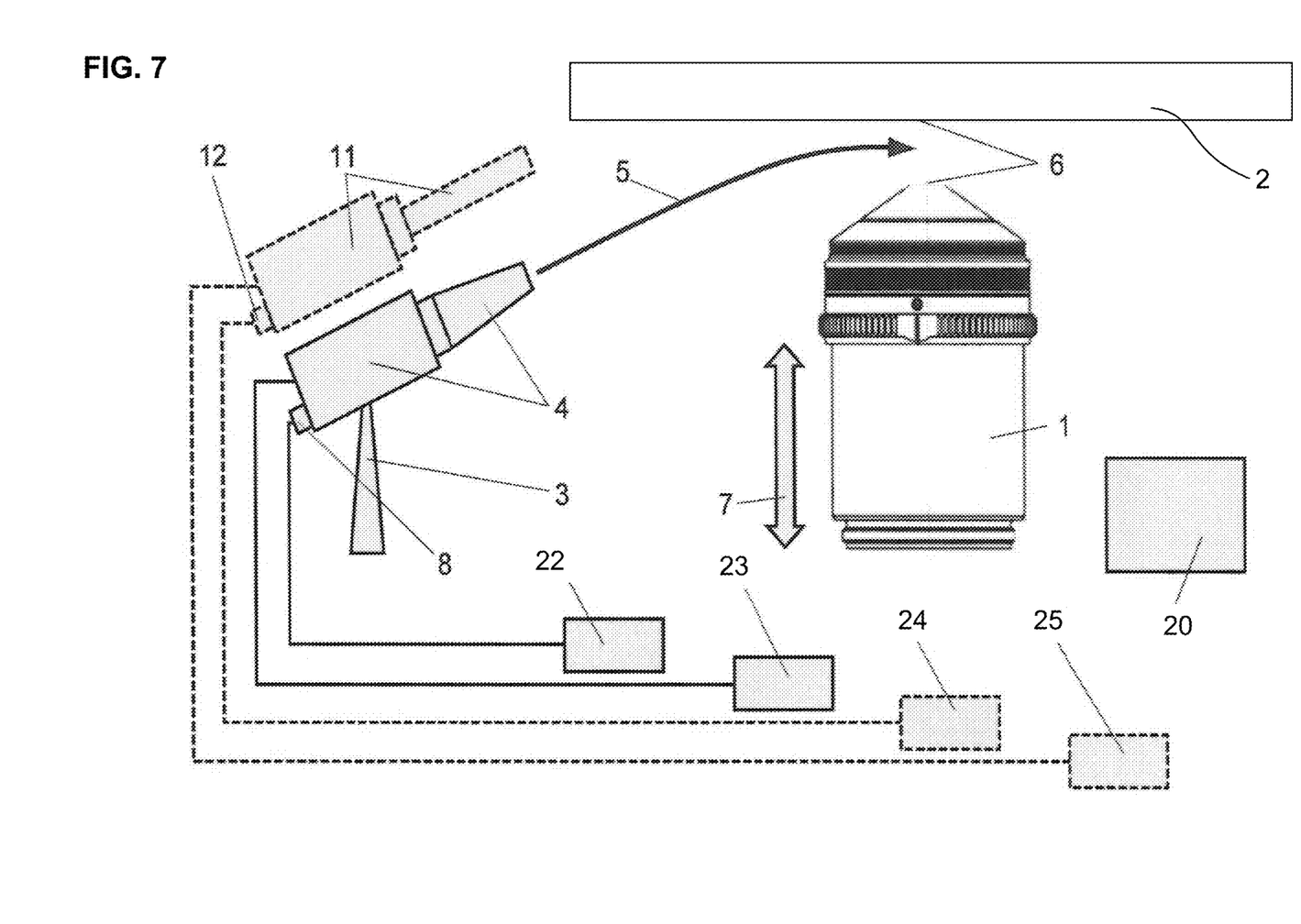
FIG. 7 shows a representation similar to FIG. 6 with different variants for generating a vapor or spray.

In FIG. 7, two devices of an autoimmersion system with a for example thermal, ultrasonic or piezo-based vapor atomizer/evaporator corresponding to the aforementioned second and third vapor-generation method are schematically represented on an inverted microscope.

In a likewise typical inverted microscope arrangement, a focusable objective 1 is arranged below a specimen carrier or microscope stage 2, the immersion area for forming a meniscus 6 being located in the clearance 6 between the objective 1 and the specimen carrier 2. A directed vapor jet 5 is generated by a thermal vapor generator with a nozzle 4 (corresponding to the aforementioned second spray generation method), which is attached to a holder 3 at a suitable location on the microscope stand with structurally free access to the immersion area 6, and is transported towards the immersion area 6 to cause formation of an immersion-medium meniscus 6 between the objective 1 and the specimen carrier 2 by droplet condensation and capillary action. The thermal vapor generator comprising nozzle 4 has a corresponding liquid terminal 8, which is connected to a liquid supply device 22 of the thermal vapor generator. A control unit 23 is used for controlling all of the specific processes on the thermal vapor generator having nozzle 4, e.g. evaporation temperatures, liquid volumes/pressures and possibly required air pressures for vapor transport in the directed vapor jet 5.

An alternative method for generating vapor is likewise shown in FIG. 7 (system components depicted by dashed lines) and uses instead of the thermal vapor generator 4 described above a vibration vapor generator 11 (corresponding to the aforementioned third generation method), which consists of an evaporator having liquid reservoir and nozzle. The vapor generator 11 having nozzle 4 has likewise a corresponding liquid terminal 12, which is connected to a liquid supply device 13 of the vapor generator 11. A control unit 24 is used for controlling all specific processes on the vapor generator 11 having nozzle 4, e.g. control data for the piezo element, optionally for an additional Peltier element (not shown separately), liquid volumes/pressures and optionally required air pressures for vapor transport in the directed jet 5. In order to generate a high vapor concentration in the jet 5, the liquid reservoir integrated in the vapor generator 11 can be cooled, for example by a Peltier element (not shown separately), so that vapor condensation on the way to and in the nozzle is reduced. Suction intake and mixing of the mist generated by the piezo element with air can take place for example via a so-called Venturi tube/Venturi nozzle or via a jet pump (the two functional units are not shown separately) that works with air as driving medium. By choosing a suitable nozzle geometry and nozzle opening, e.g. by discharging the mist through a flat nozzle, good guidance of the jet 5 with minimal vapor condensation in the nozzle 4 is achieved. The directed discharge of the mist over a small spray cone angle in the direction of the specimen carrier 2, driven by the air jet at a sufficiently high speed, i.e. a sufficiently high impulse for the mist, advantageously avoids vapor wetting of components surrounding in the space of the microscope close to the specimen. With a distance of for example 25 mm between the nozzle outlet of the vapor generator 11 and the specimen carrier 2, a spray cone angle of approximately 20° would be sufficient to cover an area with a width of approximately 10 mm on the specimen carrier 2 from an initial jet diameter of 3-5 mm of the jet 5.

All of the functional assemblies of the two different types of generation shown by way of example (thermal or mechanical) are optionally linked within the overall microscopic system; they and their system parameters are controlled via a central control unit 20, e.g. by a computer with special control software.

Advantages of the immersion described are:

A particularly gentle, easy-to-automate replenishing-immersion method for sensitive microscopic long-term experiments, e.g. Live Cell Imaging, Time Labs, high resolution methods, for which there is still no satisfactory technical solution according to the prior art.

An automatable method for all fluid immersion media, such as water, glycerine, or immersion oils.

Good suitability for combining with microscopic incubation methods due to automatability and adaptability of the physical-technical process parameters.

Compared to all liquid-immersion injection methods according to the prior art, spray or vapor immersion does not require any additional measures to eliminate air bubbles. This results in: a productivity advantage, minimization of errors, no interruption of microscopic long-term experiments due to incorrect replenishing-immersions.

The positioning of the nozzle for applying the immersion medium is important for successful immersion, both in first immersion and in replenishing-immersion. If the nozzle is as close as possible to the region that is to be examined by the microscope, the application of the immersion medium can thus be better concentrated in the region to be examined. The embodiment of FIG. 8 therefore provides an adjustable nozzle 4 which can be spatially adjusted by a drive 28. The drive 28 is connected to the central control unit 20, which has already been explained. The objective 1 is held on an objective changer 32, which is activated by the control unit 20 and can change the objective 1 for another objective. In this case, the objective 1 and/or the other objective must be moved through a change volume 34. Hence, no other structure may be present in this change volume 34, when the objective is changed, since otherwise a collision with the objective and/or the objective changer 32 would occur.

Figure 8:
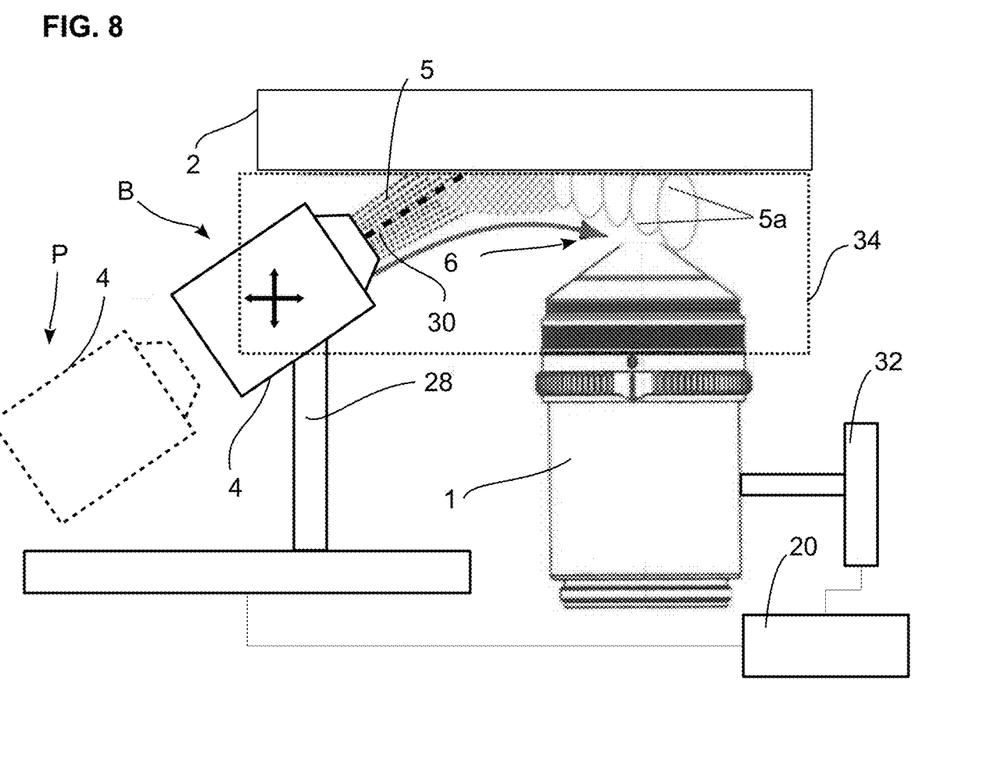
FIG. 8 shows a schematic representation corresponding to FIG. 1 relating to an adjustment of the position of a nozzle for applying the immersion medium, synchronized with change of the objective.

The drive 28 adjusts the position of the axis, for example of a nozzle 4, so that it gets out of the change volume 34, preferably in two degrees of freedom. In embodiments, it may be sufficient to adjust the position of the nozzle along a jet axis 30 on which the jet is emitted onto the specimen 2. In the case of a two degrees of freedom adjustment, it is possible to adjust not only the position along the jet axis 30, but also the point of impact of the jet axis 30 on the specimen 2. In a particularly preferred development with one- or two degrees of freedom adjustment, the inclination of the nozzle 4 can be adjusted by the drive 28.

The control unit 20 thus synchronizes the drive for the objective changer 32 and the drive 28 for the nozzle 4 when the objective is changed. The control unit 20 actuates the drive 28 in such a way that the nozzle 4 is moved to a parking position P (dashed line in FIG. 8), in which the objective can be changed without a collision between objectives to be changed on the one hand and the nozzle 4 on the other hand. Once the nozzle 4 has reached the parking position P, the control unit 20 activates the objective changer 32 to change the objective and another objective is brought into position, for example is swivelled in by means of a turret. The control unit 20 then activates the drive 28 in such a way that the nozzle 4 is brought into an operating position B, which is required for applying the immersion medium. This position can then be chosen in such a way that it would hinder changing the objective. In other words, there is greater freedom to choose the position of the nozzle 4 that is adjusted by the drive 28. Consequently, whenever no change of the objective is taking place, the operating position and preferably also the alignment of the nozzle 4 are always chosen such that the immersion medium can be optimally applied along the jet axis 30. In embodiments, the operating position and in particular the alignment can be chosen on basis of the objective. The control unit 20 then activates the drive 28 after a change of the objective in such a way that the drive 28 moves the nozzle 4 back from the parking position P, which cleared the change volume 34 and was chosen exclusively according to the criteria of the best possible head-room for the change of the objective, into the operating position B, which occupies the change volume 34 and optionally depends on the objective 1 currently being used for microscopy. In addition, the control unit 20 also activates the jet nozzle 4 in such a way that no jet 5 is emitted when the nozzle is not in the operating position B, in particular if it is in the parking position P. The control unit 20 switches off the jet 5 from the nozzle 4 before it moves the nozzle 4 out of the operating position B by the drive 28.

In this way, best possible application of immersion medium is reconciled with convenient and safe changing of the objective. The drive 28 position of both, the parking position P and the preferably objective-dependent operating position B, are stored in the control unit 20. They can optionally be set by a user, for example when a new objective is attached to the objective changer 32.

In embodiments, the operating position B can be optimized for individual objectives. The control unit 20 activates the drive 28 after a change of the objective in such a way that the drive 28 moves the nozzle 4 out of the parking position P, which was chosen exclusively according to the criteria of the best possible place for the change of the objective, into the operating position B, which depends on the actual objective 1 currently being used for microscopy and occupies the change volume 34.

In this way, best possible application of immersion medium is reconciled with convenient and safe changing of the objective. The drive 28 position of both, the parking position P and the preferably objective-dependent operating position B, are stored in the control unit 20. They can optionally be set by a user, for example when a new objective is attached to the objective changer 32 for swivelling in or the like.

The invention claimed is:

1. An apparatus for applying a liquid immersion medium into a clearance between a microscope objective and a specimen spaced apart from and facing the microscope objective, the specimen to be examined under the microscope, the apparatus having an injection device configured to introduce the immersion medium directly laterally into the clearance as a spray jet including liquid droplets mixed with air, or as a vapor jet.

2. The apparatus as claimed in claim 1, wherein the injection device comprises a pressure-atomizing spray nozzle, designed to eject the immersion medium as a spray and spray it into the clearance as a spray jet.

3. The apparatus as claimed in claim 1, wherein the injection device comprises a reservoir for the immersion medium and a vapor or spray generator fed by the reservoir and a gas-injection device.

4. The apparatus as claimed in claim 3, wherein the vapor or spray generator is a heated, thermal vapor or spray generator.

5. The apparatus as claimed in claim 3, wherein the vapor or spray generator is a vibration nebulizer comprising an ultrasonic vibrator.

6. The apparatus as claimed in claim 1, wherein the injection device is configured to spray the immersion medium into the clearance in such a way that the vapor or spray jet is designed for at least one of the following: establishing a clearance meniscus of immersion medium filling the clearance initially, and maintaining a meniscus of immersion medium that is already filling the clearance.

7. The apparatus as claimed in claim 1, wherein the injection device comprises a first operating mode, in which the vapor or spray jet is adapted to establish a clearance meniscus of immersion medium filling the clearance initially, and a second operating mode, in which the vapor or spray jet is adapted to maintain a meniscus of immersion medium that is already filling the clearance.

8. The apparatus as claimed in claim 1, wherein the vapor or spray jet extends over an adjustable range between 3 and 30 mm in length.

9. A microscope with a microscope objective, a holder for a specimen and an apparatus for applying a liquid immersion medium into a clearance between a microscope objective and a specimen spaced apart from and facing the microscope objective, the specimen to be examined under the microscope, the apparatus having an injection device configured to introduce the immersion medium directly laterally into the clearance as a spray jet including liquid droplets mixed with air, or as a vapor jet.

10. The microscope as claimed in claim 9, comprising a motorized objective changer, configured to move the microscope objective through a change volume when changing between microscope objectives, a drive for adjusting a position of the injection device, and a control unit, the control unit being connected in a controlling manner to the objective changer and the drive, the control unit being configured to activate the drive to move the injection device into a parking position, clearing the change volume, to activate the objective changer to change between microscope objectives, and to activate the drive subsequently to move the injection device into an operating position lying in the change volume.

11. The microscope as claimed in claim 10, wherein the operating position is a function of type of the microscope objective.

12. A method for applying a liquid immersion medium into a clearance between a microscope objective and a specimen spaced apart from and facing the microscope objective, the specimen to be examined under the microscope, comprising the step of using an injection device to introduce the immersion medium directly laterally into the clearance as a spray jet including liquid droplets mixed with air, or as a vapor jet.

13. The method as claimed in claim 12, further comprising the step of generating the jet by means of a pressure-atomizing spray nozzle.

14. The method as claimed in claim 12, further comprising the step of generating the vapor or spray jet by means of a vapor or spray generator and spraying the vapor or spray generated into the clearance as a jet from the injection device.

15. The method as claimed in claim 14, further comprising the step of generating the vapor or spray by thermal vapor generating or thermal spray generating.

16. The method as claimed in claim 14, further comprising the step of generating the vapor or spray by vibration nebulization by using an ultrasonic vibrator.

17. The method as claimed in claim 12, further comprising the steps of spraying the vapor or spray jet and still further at least one of establishing a clearance meniscus of immersion medium for filling the clearance initially, and maintaining a meniscus of immersion medium that is already filling the clearance.

18. The method as claimed in claim 12, wherein the vapor or spray jet extends over a length of between 3 and 30 mm.

19. The method as claimed in claim 12, comprising the step of using a drive for adjusting the position of the injection device and using a motorized objective changer moving the microscope objective through a change volume when changing between microscope objectives, wherein a change between microscope objectives comprises a sequence of steps of moving the injection device by means of the drive into a parking position, clearing the change volume, then changing between microscope objectives by means of the objective changer and subsequently moving the injection device by means of the drive into an operating position lying in the change volume.

20. The method as claimed in claim 19, wherein the operating position is chosen as a function of type of the microscope objective.

\* \* \* \* \*